May 24, 1938.  A. AMES, JR., ET AL  2,118,132
CORRECTING OCULAR DEFECTS
Filed Oct. 26, 1934  4 Sheets-Sheet 1
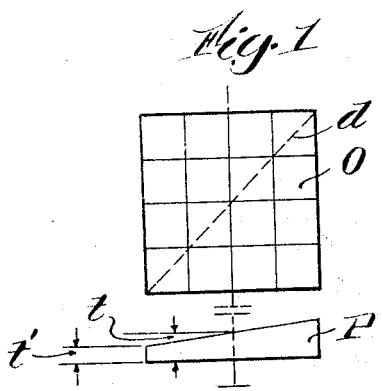
Fig. 1
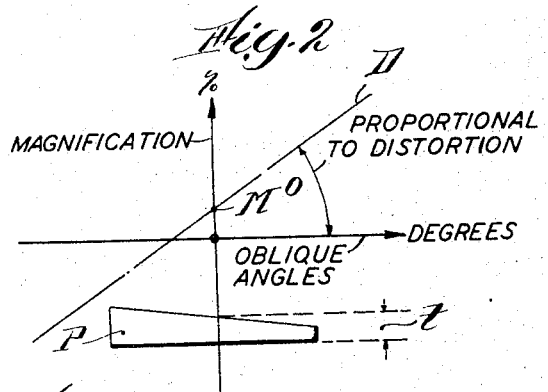
Fig. 2
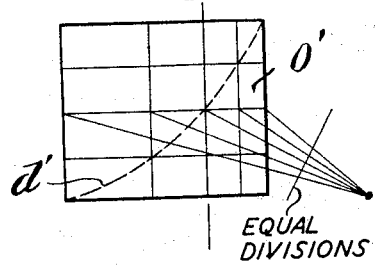
Fig. 3  Fig. 4
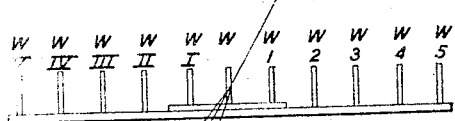
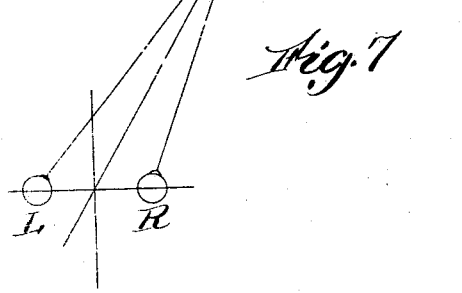
Fig. 7
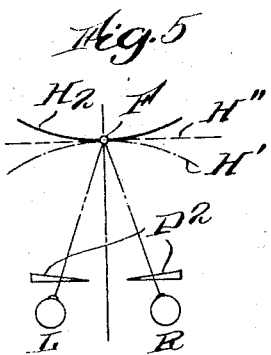
Fig. 5
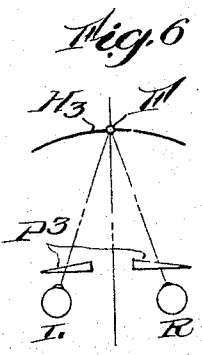
Fig. 6
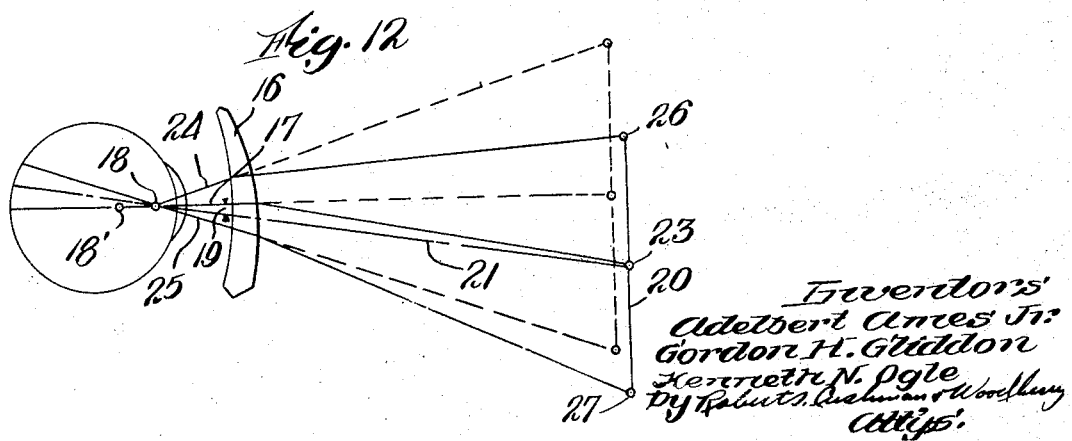
Fig. 12
Inventors'
Adelbert Ames Jr.
Gordon H. Glidden
Kenneth N. Ogle
By Roberts, Cushman & Woodbury
Attys.

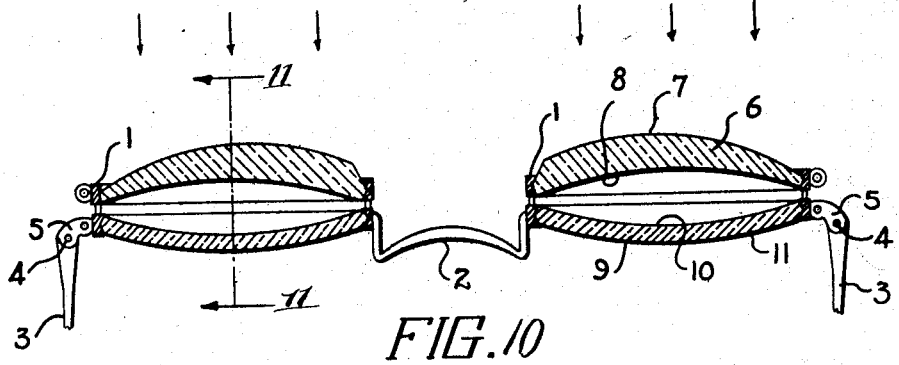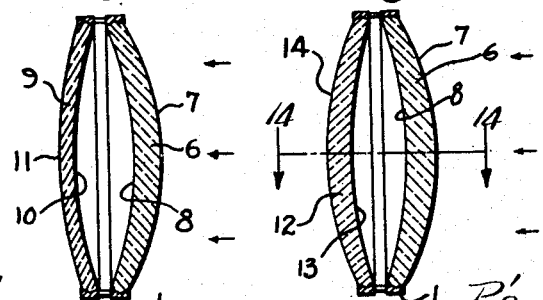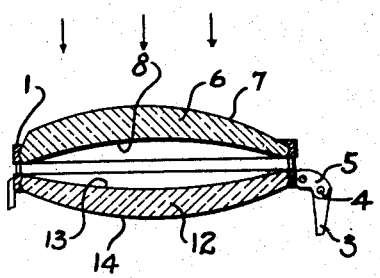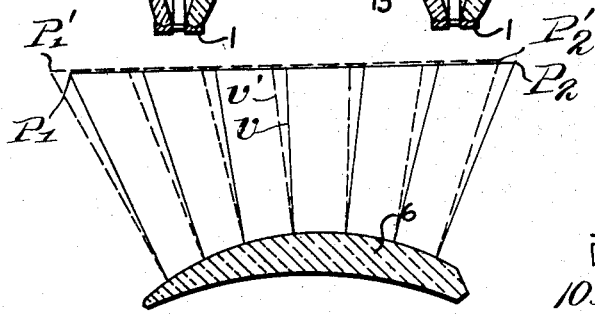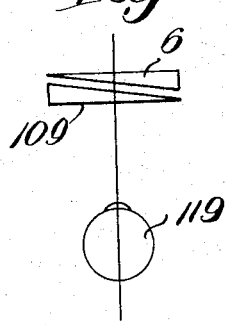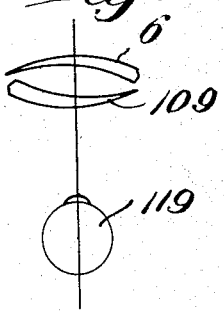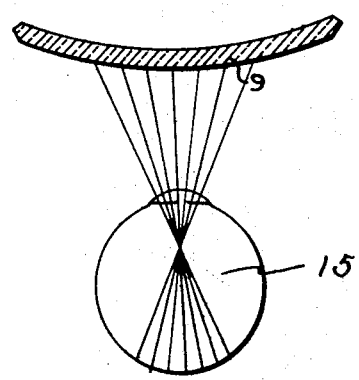

May 24, 1938.  A. AMES, JR., ET AL  2,118,132
CORRECTING OCULAR DEFECTS
Filed Oct. 26, 1934   4 Sheets-Sheet 4

INVENTORS
Adelbert Ames Jr.
Gordon H. Gliddon
Kenneth N. Ogle
By Roberts, Cushman & Woodberry
ATTORNEYS Patented May 24, 1938

2,118,132

UNITED STATES PATENT OFFICE 2,118,132

CORRECTING OCULAR DEFECTS

Adelbert Ames, Jr., Gordon H. Gliddon, and Kenneth N. Ogle, Hanover, N. H., assignors to Trustees of Dartmouth College, Hanover, N. H., a corporation of New Hampshire Application October 26, 1934, Serial No. 750,162

12 Claims. (Cl. 88—54)

Heretofore, various defects of the eyes have been known and corrected in different ways appropriate to these defects. For example, dioptric errors have been corrected by spherical, cylindrical or toric lenses, and muscular defects or phorias by means of prism lenses which affect the vergence of the eyes by changing the direction of the line of sight of an eyeball when the ocular muscles fail to turn it correctly.

More recently, a hitherto not investigated but quite common eye defect has been found which will be referred to as aniseikonia and involves differences in size and/or shape of the ocular images in binocular vision, also referred to as eikonic conditions. The term "ocular image" describes the impression formed in the higher brain centers through the vision of one eye. It is determined not only by the properties of the dioptric image that is formed in the retina of the eye, but also by the modifications imposed upon that image by the anatomical properties and physiological processes by which this image is carried to the higher brain centers.

Methods and instruments for evaluating aniseikonias are for example described in the Patent No. 1,944,871 of January 30, 1934 to Adelbert Ames, Jr. and Gordon H. Gliddon, and in the Patent No. 1,954,399 of April 10, 1934 to Adelbert Ames, Jr. Spectacles for correcting aniseikonias, also referred to as iseikonic spectacles, have also been developed and are described for example in the Patent No. 1,933,578 of November 7, 1933 to Adelbert Ames, Jr. and Gordon H. Gliddon. Such iseikonic spectacles change the magnification to a predetermined degree and may or may not have in addition a specified dioptric effect.

Aniseikonia may be of the so-called overall type in which one image is larger than the other in all meridians, or it may be meridional, where one image is larger than the other in one meridian. Meridional aniseikonia may be uniform with respect to that meridian, or it may have the form of distortional disparity along that meridian, principally the horizontal one.

Disparities of the latter type correspond to the effects of prisms, which distort an image in the meridian in which they bend the line of sight. Therefore, prisms can be used for compensating or rectifying such distortional aniseikonias. However, ordinary prisms used for correcting this defect would change the vergence of the eyes and introduce a new defect equivalent to muscular defects as phoria or tropias tending to cause the patient to see two objects where in reality there is only one.

It is therefore one of the objects of this invention to provide a method and means for correcting distortional aniseikonia by distorting the image formed on the retina of an eye without changing the direction of the line of sight.

Such means, however, which could introduce corrective distortion without unwanted change of vergence, would in many cases change the dioptric and/or overall and meridional magnification properties of the eyes introducing thereby these types of aniseikonia. It is, therefore, another object of this invention to provide methods and means for correctively distorting the image formed on the retina of an eye, while at the same time controlling the dioptric and/or overall and uniformly meridional eikonic properties of the eyes.

If prisms are used to correct phoria only, no distortional aniseikonia being present, the distortional effect of the prisms introduces the latter defect to the disadvantage of the wearer. Our invention permits, in another aspect thereof, a change of vergence, or direction of lines of sight, without distorting the image, or by introducing a predetermined amount of distortion and at the same time, if required, controlling the dioptric and eikonic conditions.

In its general aspect, the invention has therefore the object of providing a method and means for evaluating or correcting phoria and dioptric defects, and overall, meridional and distortional aniseikonia of the eyes, whereby any one, several, or all of these defects may be inherently present, or introduced by correcting one, or several of the other defects.

These and other objects, features and aspects of our invention will be apparent from the following detailed explanation thereof illustrating its genus with reference to general practical embodiments. The description refers to drawings in which:

Fig. 1 is a schematical representation of the distortion effect of a prism;

Fig. 2 is a diagram showing the relation between distortion and magnification of a prism;

Figs. 3 to 6 are diagrams explaining the effect of prisms upon the horopter;

Fig. 7 is a diagrammatical representation of apparatus for carrying out partition measurements;

Fig. 10 is a plan view, partly in section, showing a spectacle frame in which is mounted one embodiment of our invention;

Fig. 11 is a vertical cross-section of Fig. 10 taken along line 11—11 thereof;

Fig. 12 is a diagrammatic view illustrating the method of designing a distortionless prism;

Fig. 13 is a vertical cross-section of a slightly modified form of our invention;

Fig. 14 is a horizontal cross-section of the device shown in Fig. 13, taken along the line 14—14 thereof;

Fig. 15 is a diagrammatic illustration showing our invention in position before an eye;

Fig. 16 is an elevation of the principal lens used in carrying out our invention;

Figs. 25 and 26 show lens combinations according to Tables VII and VIII.

Figure 8:
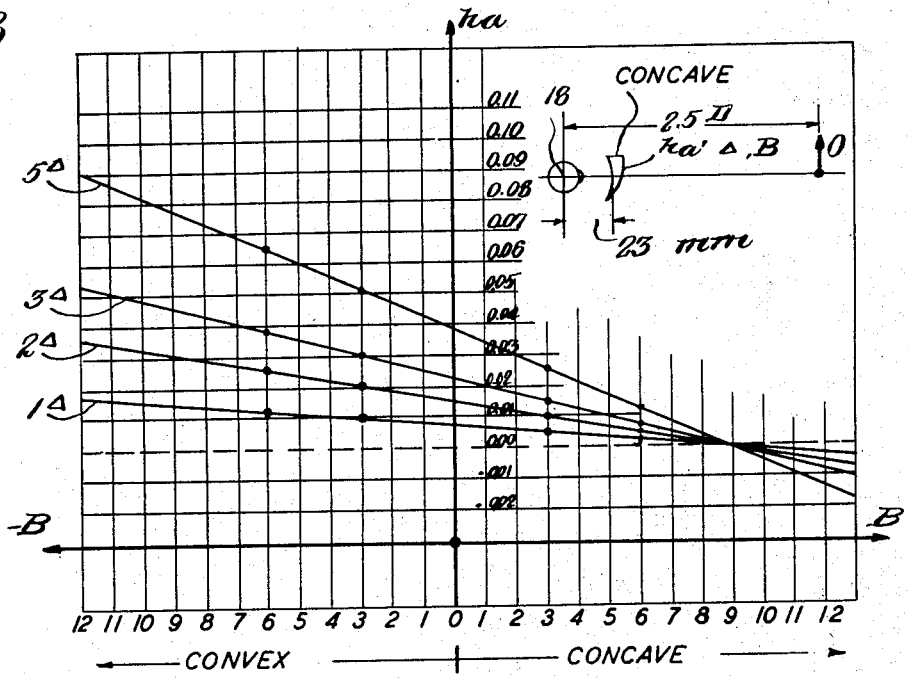
Figs. 8 and 9 are diagrams giving the relations between distortion, prism power and base curve.

For a better understanding of the invention, the distortion effected by prisms, and the distortional aniseikonic defects of the eyes will first be discussed.

The distortion of an eyeglass for a given fixation distance will herein be understood to mean the change in the per cent magnification of the eyeglass for increasing peripheral angles. Analogously, it will be the change in the per cent difference in the angular size of the object and the image produced by the eyeglass, reckoned from the anterior nodal point of the eye, for increasing values of the angular size of the object. Thus, for a distortionless lens this change will be zero, while for a pin-cushion distortion it will vary, increasing with the increase in the angular size of the object.

The type of distortion exhibited by prisms in the plane of the deviation is, within about 20° of the deviation, that of a constant change as indicated in Fig. 1, where O is an object in the form of a divided square, which appears distorted as shown at O' if viewed through a prism P. It will be evident that meridian $d$, and similarly any inclined meridian, is distorted as indicated at $d'$. Thus, as graphically shown in Fig. 2, the distortion of a prism P will be represented by an approximately straight line D (related to the position of the prism as indicated in Fig. 2) in a system of coordinates representing magnification M and oblique angles $\phi$, (see Fig. 3) respectively. The magnitude of the distortion, above defined as the change in per cent magnification per degree $(\phi)$ and herein called $$h_o = \frac{d(M-1)\%}{d\phi},$$

is then graphically expressed by the slope of the distortion line D. The intersect $M_0$ on the magnification axis is the overall magnification of the prism in the plane of the deviation, and, for purposes of this invention, indicates the magnitude of magnification of the zero effective power lens necessary to counteract this magnification, as will be explained more in detail hereinafter.

We observed that, physiologically, the pathological distortion of the ocular images (principally in the horizontal meridian) causing the above-mentioned distortional aniseikonia is, generally speaking, of the same nature as the just described distortion effected by prisms. It is further a fact that, in binocular vision, the magnitude of the two ocular image distortions determines the shape of the longitudinal horopter.

The horopter, which may be defined as the surface in space, every point on which is imaged on corresponding retinal points, is substantially symmetrical with respect to a vertical plane through the medial line of sight of a person having no eikonic defects. If, however, the ocular images or portions thereof have different sizes, one and the same object appears smaller to that eye which produces a more extended ocular image. This causes in binocular vision an apparent change in location and/or shape of the object. For example, a difference in overall size of the ocular images produces a rotation of the longitudinal horopter, which may be described as the intersection of the horopter surface and fans of projection lines from the mean nodal points of the eyes, these fans being confined in a plane through these nodal points. This rotation of the longitudinal horopter appears to take place about a vertical axis passing through the point of fixation at which the eyes are looking, the horopter portion at the side of the eye with the larger ocular image appearing more distant.

Fig. 3 indicates the location of the longitudinal horopter of a person with normal eyes, H being the horopter trace (which may be for a certain visual distance $b$ a straight line), and F a fixation point, determining vergence, at the distance $b$ from R and L, the right and left eyes, respectively, of the observer. Fig. 4 shows the location of the horopter trace $H_1$ if, under otherwise similar conditions, the ocular image of the left eye is larger, due to the interposition of a size changing lens S before that eye, or to a corresponding pathological difference of the ocular images.

Distortional aniseikonias, either inherent or introduced by prisms, have the effect of apparently curving the horopter, in a manner indicated in Figs. 5 and 6, where $H_2$ and $H_3$ are the longitudinal horopter traces apparent to normal eyes due to prisms $P_2$ and $P_3$, respectively. Abnormal eyes having a corresponding distortional aniseikonia produce a similar effect. Defects of this type can be measured with instruments of the general type described in the above-mentioned Patent No. 1,954,399. A patient having aniseikonia exemplified in Fig. 5 would move the points of a horopter instrument to actual positions indicating trace H', in order to see them apparently placed as indicated by trace H''. By placing before the patient's eyes distorting prisms which produce coincidence of apparent horopter and actual horopter instrument setting, that is, which move H' and H'', it is possible to correct this defect which, even if present only to a very low degree, may cause serious illness.

A convenient way to measure distortional aniseikonia quantitatively is the so-called "Multiple Partition Test" which is based on the same principle as the horopter experiments, and which is conducted as follows: A series of object points represented by threads or wires are arranged so that, as seen by each eye, all appear equally separated directionally. As shown in Fig. 7 in oblique projection, a series of wires W, $W_1$, $W_2$, etc., and $W_I$ and $W_{II}$, etc., respectively, is placed before each eye. Wire W serves as a fixation object and may be fixed, as well as $W_1$ and $W_I$, the distances W, $W_1$ and $W_I$ being kept constant. The other wires are laterally movable and the patient, looking at W, $W_1$, $W_2$, $W_3$, $W_4$, $W_5$ with the right eye adjusts the wires so that they appear to be equally spaced. If he has a distortional defect, the wires will actually be unequally spaced, and their positions provide a measure of the amount of distortion, which can be checked with the aid of prisms correcting the defect. The other eye is similarly examined with wires W, $W_I$, $W_{II}$, etc., and the combined effective distortion of both eyes must correlate with the unbalanced distortion of the horopter.

The shape of the longitudinal horopter, then, is a measure of the unbalanced distortion between the ocular images of the two eyes in the longitudinal meridian. Hence, the unit describing the distortion of prisms should be of the order of changes of the ocular images for corresponding changes of the longitudinal horopter.

Thus, the unit of prism distortion may be defined to signify 0.1% magnification change per one degree peripheral angle. A prism having a unit of distortion when placed before one eye of an ideal observer at a definite fixation distance, would cause the horopter trace of zero or unbalanced distortion (also called Vieth-Müller circle), to recede to the frontal plane. Now in horopter theory, the distortion is defined as $$h = \frac{dM}{d \tan \phi}$$

that is the change in magnification per tangent of peripheral angle, and $h = 2a/b$ when the longitudinal horopter lies in the frontal plane, where $2a$ will be the interpupillary distance and $b$ the distance from the median nodal point of the two eyes to the point of fixation. If the above ideal observer is assumed to have an interpupillary distance of 60 mm. and if his horopter race is to be taken at 1 m. distance from the eyes (compare Fig. 3), then the value of $h$ for this change is $$h = \frac{60}{1000} = 0.06$$

The optical prism distortion is defined, however as $$ha = \frac{dM}{d\phi} \times (100)$$

$$h_a = (1.74)h$$

Thus $$h = \frac{2a}{b}$$

for the values given above $$h_a = 0.1\%$$

It will now be evident that conventional prisms used for correcting vergence (phoria) defects may introduce eikonic disturbances and that, on the other hand, conventional prisms used for correcting distortional aniseikonia would most likely cause a change in the relation of the lines of sight of the eyes equivalent to phorias. There are also intermediate cases requiring correction of both distortionally eikonic and muscular defects, and therefore control of both distortion and deviation of the lines of sight by optical means. In addition, it may be necessary to correct dioptric defects and eikonic defects other than distortion.

According to our invention, we control the effect of lenses including prism elements by appropriately curving or bending prism components and, if desirable, combining them with other prism components and/or lens elements not directly influencing the direction of the line of sight.

For purposes of our invention, it is necessary to correlate the various characteristics of optical prisms. While this can be done analytically, it was found that a more convenient way, at least for preliminary or approximate computations, is to relate these characteristics graphically, as will now be described.

Figure 9:
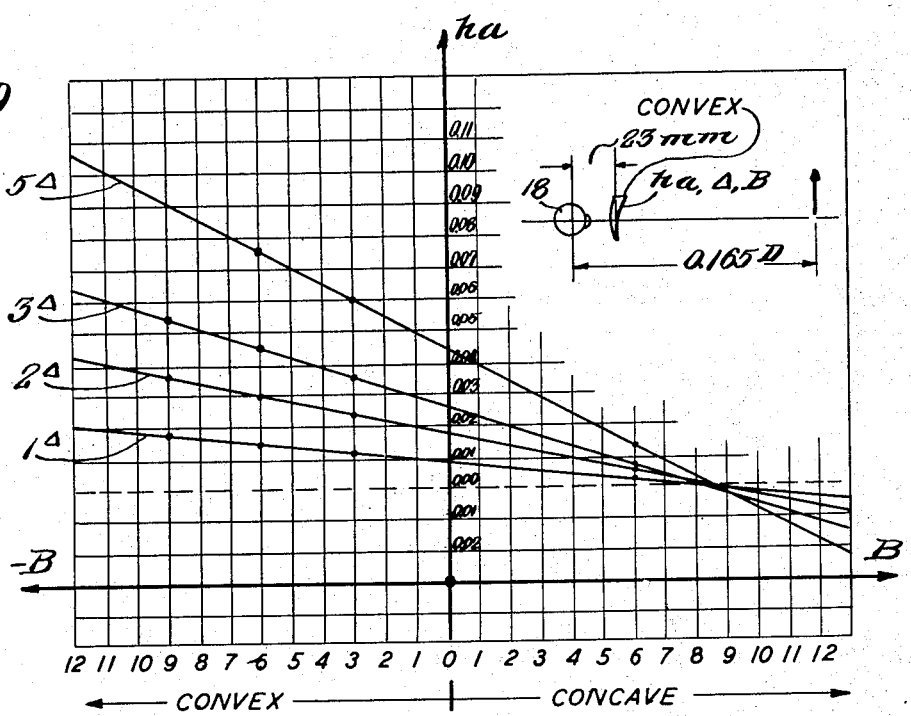

With the above discussed unit for the prism distortion $h_a$, the properties of prisms have been laid down graphically as shown in Figs. 8 and 9. The effect of a prism depends principally on prism power, curvature (that is the base curve upon which the prism is ground), thickness of the prism, distance of prism from eye, and degree of tipping with respect to the visual axis.

In these graphs, the distortion $h_a$ (already defined as the change in per cent magnification per unit peripheral angle) is plotted against the base curves B in diopters, for various prism powers $\Delta$. As minus base curves are indicated those which result in lenses concave to the eye, and as plus bases those which result in ocular surfaces convex to the eye. Intermediate prism powers are omitted for the sake of clarity. The curves are drawn for a distance of about 23 mm. from the anterior prism surface to the nodal point of the eye, that surface being always perpendicular to the line of sight. Fig. 8 shows the relations for infinite or relaxation visual distance (that is, the distance between nodal point and the observed object), to which a distance of about 6 m. is practically equivalent, and Fig. 9 is similarly drawn for reading distance, of about 40 cm. For the sake of practical convenience, the curves are made up for a constant trim ($t'$ of Fig. 1) of about 1 mm. and varying center thickness $t$, but could also be computed for constant $t$. Similar charts can be made up for different distances from the eye to the prism.

These graphical representations of prism characteristics which, as already pointed out, are especially convenient for purposes of the present invention, can be obtained empirically by actually measuring prisms, or by conventional triangulation ray tracing methods well known in the art of optics.

While our invention provides for general control of distortion, deviation of the line of sight and dioptric and eikonic defects by appropriately bending prism elements and in certain instances combining them with other similar or different optical elements, two especially significant embodiments thereof are the correction of distortional aniseikonia without affecting the lines of sight, and of diverting the latter for corrective purposes, without introducing distortion. The latter is the simplest modification which may be called "Distortionless Prism" and will first be described. Prisms of this type are especially valuable in phoria cases which could not be corrected with conventional prisms, because of the distortion thereby introduced.

In Fig. 10 there is shown a spectacle frame consisting of a pair of double rims 1 for holding the lenses, a bridge member 2 connecting said rims, and a pair of temples 3, hinged at 4 to endpieces 5, which are in turn secured to portions of the rims 1 remote from the bridge 2.

It will be obvious that any suitable well known form of lens holding means may be used, or that a special type of frame may be designed if found necessary, the spectacle frame illustrated being shown by way of example only. Also, it is in certain instances possible to join the lens elements directly, for example by cementing, and to mount them in a more conventional frame.

As will now be evident from the preceding discussion of the relation of prism power, base curve and distortion, it is possible to find prisms having a particular curvature in the plane of the base-apex line as shown at 7 and 8 on the lens 6 of Figs. 10 and 11, which prisms bend the line of sight without distorting the image in the plane of the bending or, in other words, which have zero distortion $h_a$ together with a predetermined prism power $\Delta$, suited to correct the ocular defect of an individual patient.

The data of a prism of this type may in any instance be found either directly by means of previously prepared graphs similar to those of Figs. 8 and 9, or by a trial and error method consisting of two main steps.

First, a prism 16 (referring to Fig. 12) of given parameters is laid out and computations are made to determine whether or not that particular set of parameters gives the desired deviation. Such computations consist of tracing an axial ray of light 17 from a point 18' representing the center of rotation of the eye through the prism 16 at the angle 19 which it is desired to cause the eye to turn in viewing a given object 20. This ray returns to, or intersects the normal line of sight 21 (along which the eye would view the object directly) at 23, the distance of the object from the eye. If the ray does not intersect at 23, the parameters are changed until this ray 17 does meet the line 21 at the proper distance from the eye.

Second, the distortion is determined for the prism which is selected by the first step, by means of tracing two oblique rays 24 and 25, having equal angles of obliquity, from the point 18 representing the nodal point of the eye through the base and apex portions of the prism respectively. If the two oblique rays are about equal distances from the axial ray at 26 and 27 (the distance of the object from the eye), there will be no distortion of the object. If the distortion properties of the prism prove to be unsatisfactory, the process must be repeated, taking a prism of a different set of parameters, until one is found which will satisfy all conditions.

The rays are traced by the method commonly known in the art of optics as triangulation.

By way of example, a prism 5 mm. thick having a convex curvature of 52.6714 mm. radius and a concave curvature of 68.7983 mm. radius and a prism power of 7.388$\Delta$ (angle of deviation=$\delta$=4.255°)

when placed with its first surface 40.24 mm. from the center of rotation of the eye and perpendicular to a straight axis between the eye and the object, has been found to have a practically negligible distortion.

The characteristics of a series of prisms of this type, in steps of one $\Delta$, are given in Table I below.

In making prisms curved as above described, it has been found that the elimination of image distortion in the meridian of the base apex line of the prism, is accompanied by a change in the size of the image in that meridian so that the image would appear in its approximately correct size in the meridian perpendicular to the base apex line, but would appear of a different size in the meridian of the base apex line. Therefore, such cylindrical prisms, if used before one eye only, would produce a relative difference in the shape of the two ocular images. When distortionless prisms of equal power are put before each eye, no differences in the relative shape and size of the ocular images are produced. While such pairs of cylindrical prisms are of practical use, they have the disadvantage that, even when so used, they make objects appear broader than high. In order to bring the image back to its proper proportions the lenses 6 have also been curved in the plane perpendicular to the base-apex line, as indicated in Fig. 11, so as to change the size of the image in that meridian. In order that the size of the images in both these meridians be exactly the same, the curvatures of the prisms in the two meridians must be slightly different. That is, the lens must be of toric form. Table III gives the curvatures in the two meridians necessary to equalize exactly the size in both meridians for a series of prisms varying by steps of 1 prism diopter.

If the curvatures in the two meridians are made the same, that is if the lens is given a meniscus spherical form, some differences in the size of the images will be produced. These differences are shown for a series of prisms in Tables I and II.

While such variations would cause too great a difference between the ocular images if a single prism were used before one eye, they would not if equal prisms are placed before both eyes. In practice such types of spherical meniscus prisms are most useful. They also have the advantage of being much more easily and cheaply made.

TABLE I

Constants of Distortionless Prisms

*Assuming the eye turns to take up prism power first surface of lens is 28.83 mm. from center of rotation of eye*

| Prism power $\Delta$ | Angle between the two faces of the prism at the axis, degrees | Thickness mm. | Convex radius mm. | Convex radius mm. |
|---|---|---|---|---|
| 1 | 1.095 | 2.95 | 51.66 | 50.65 |
| 2 | 2.190 | 2.95 | 50.66 | 49.64 |
| 3 | 3.283 | 2.95 | 49.66 | 48.65 |
| 4 | 4.373 | 2.95 | 48.68 | 47.67 |
| 5 | 5.439 | 2.95 | 47.73 | 46.71 |
| 5 | 5.461 | 4.75 | 45.53 | 43.90 |
| 6 | 6.543 | 4.75 | 45.97 | 44.33 |
| 7 | 7.623 | 4.75 | 46.42 | 44.78 |
| 8 | 8.697 | 4.75 | 46.88 | 45.25 |
| 9 | 9.766 | 4.75 | 47.36 | 45.73 |
| 10 | 10.669 | 4.75 | 47.78 | 46.15 |

TABLE II

MAGNIFICATION OF THE DISTORTIONLESS PRISMS IN THE HORIZONTAL MERIDIAN AND THE VERTICAL MERIDIAN

*First surface of lens is 28.33 mm. from center of rotation of eye*

| Prism power Δ | Magnification horizontal percent | Magnification vertical percent |
|---|---|---|
| 1 | 2.04 | 2.03 |
| 2 | 2.08 | 2.05 |
| 3 | 2.13 | 2.07 |
| 4 | 2.18 | 2.08 |
| 5 | 2.22 | 2.08 |
| 5 | 3.80 | 3.65 |
| 6 | 3.78 | 3.56 |
| 7 | 3.76 | 3.47 |
| 8 | 3.75 | 3.37 |
| 9 | 3.75 | 3.26 |
| 10 | 3.75 | 3.16 |

TABLE III

RADII IN THE HORIZONTAL AND VERTICAL MERIDIANS TO PRODUCE THE SAME MAGNIFICATION IN THE HORIZONTAL AND VERTICAL MERIDIANS

*First surface of lens is 28.83 mm. from center of rotation of eye*

| Prism power Δ | Horizontal | | Vertical | |
|---|---|---|---|---|
| | $R_1$ mm. | $R_2$ mm. | $R_1$ mm. | $R_2$ mm. |
| 1 | 51.66 | 50.65 | 51.48 | 50.47 |
| 2 | 50.66 | 49.64 | 49.98 | 48.98 |
| 3 | 49.66 | 48.65 | 48.47 | 47.48 |
| 4 | 48.68 | 47.67 | 46.99 | 46.90 |
| 5 | 47.72 | 46.71 | 45.23 | 44.26 |
| 5 | 45.53 | 43.90 | 44.00 | 42.41 |
| 6 | 45.97 | 44.33 | 43.74 | 42.16 |
| 7 | 46.42 | 44.78 | 43.53 | 41.80 |
| 8 | 46.88 | 45.25 | 42.73 | 41.20 |
| 9 | 47.36 | 45.73 | 42.00 | 40.50 |
| 10 | 47.78 | 46.15 | 41.23 | 39.75 |

As was mentioned before with reference to Fig. 2, the prism which is curved in both directions to the proper degree for avoiding partially or entirely all distortion, and bends the line of sight as desired, effects in addition a change of the size of the ocular image in all meridians. This overall size change is equivalent to the effect of a plane parallel plate of the thickness of the prism at the line of sight and is, therefore, indicated in Fig. 2 by the magnification at oblique angle zero. If, for example, a different prism correction is given for each eye, or if a different magnification is required for each eye, for example due to inherent overall aniseikonia, the magnification properties of the prism must be corrected. For this purpose, according to our invention, we place in series with the prisms 6 (Fig. 10) the lenses 9 with curves 10 and 11 which change the size of the image back to its natural size or to a size desired, without changing the dioptric position of the image.

These lenses are designed to have no focal power when they are at a specified distance before the eye with an object at a specified distance. By the term effective "zero power" it is meant that the lenses do not change the vergence of the incident light, that is the object and the final image are at the same place. A method for calculating such lenses is given in the above-mentioned Patent No. 1,933,578.

It is evident that corrections of uniformly (as distinguished from distortional) meridional aniseikonia can be effected by introducing cylindrical size changing components, for example by making lens 9 toric, or by adding surfaces having a similar effect.

In certain cases of ocular defects it may be desirable to provide a change in focus in addition to a change in size, and in that case a power lens may be added, or a lens 12 (Figs. 13 and 14) may be substituted for lens 9 of Fig. 10. Lens 12 is of the general type of focus and size correcting lenses likewise described in the above patent and may be designed as a single lens with curves 13 and 14 changing both magnification and size to a prescribed degree.

Recapitulating, for providing a deviation of the line of sight without introducing prismatic distortion, and at the same time accounting for prescribed magnification and dioptric characteristics, we first determine the proper curves for the prism lens 6 in its apex-base meridian so that it will bend the line of sight the required amount but will not distort the image in that meridian. Next, we compute the curves necessary in the meridian perpendicular to the apex-base meridian to change the size of the image in that meridian by the same amount that the curved prism will change it in the apex-base meridian. This lens is then ground and finished.

Next, we compute the curves for the lens 9 or 12 necessary to change the size of the deflected image back to the desired size. If the focus is not to be changed, a lens like the lens 9 is used, but if the focus is to be changed, a lens like 12 or an equivalent structure effecting both size and dioptric changes to predetermined degrees is used. After these computations have been made and the lens 9 or 12 has been ground and finished, the prism lens 6 and the lens 9 or 12 are mounted in a lens holding means, such as the spectacle frame shown, by which they are held in a fixed and proper relation with respect to each other and are supported in the proper position on the face of the wearer.

It will also appear that we have provided, in this embodiment of our invention, a new means of changing the direction of pointing of an eye without distortion and with controlled magnification. In doing this we first place before the eye 15 (Fig. 15) a distortionless magnifying prism lens 6, and then place a second lens 9 or 12 before the eye in series with the first, said second lens having the proper curves thereon to compensate for the change in the size introduced in the image. This means that the line of sight is first bent without distortion but with change in size of the image, and that the change in size is then compensated for. This order may be reversed by a corresponding change in the curves of the lenses.

Accordingly, in Fig. 15 points $P_1$ and $P_2$, at equal distances from the line of sight $v$, represent an object which is imaged at $P_1'$, $P_2'$, which image points, due to the function of the distortionless prism, are at equal distances from the deviated line of sight $v'$, the distance $P_1'$—$P_2'$ being equal to distance $P_1$—$P_2$ due to the effect of size element 9, which, as indicated, retains the image plane in the object plane. It is evident that by imparting a different magnification to element 9, distance $P_1'$—$P_2'$ can be increased or diminished and that, by giving to the surfaces of element 9 unequal curvatures, vergence power can be introduced, removing the plane of $P_1'$—$P_2'$ from plane $P_1$—$P_2$. It is further understood that such magnification and power effects can be made symmetrical to any meridian instead of, or in addition to, corresponding overall effects.

Instead of calculating the lens combination for zero distortion, the prism component 6 can be chosen to have a predetermined prism power together with a chosen distortion. Again, graphs similar to Figs. 8 and 9 can be used for this purpose, or the prisms can be computed by conventional trial and error methods, in which case, referring now to Fig. 12, the oblique rays 24 and 25 will be so traced and selected that unequal distances from 26 and 27 represent the desired distortion. Examples of such prismatic elements are given below in Tables IV, V, and VI, which list series of prisms having distortion in convenient steps, each series having a constant prism power of one, three and five Δ, respectively. In this case, points $P_1'$ and $P_2'$ of Fig. 15 would be unequally spaced in relation to $v'$.

TABLE IV
Distortion of Single Prism—Power 1Δ

| Units of distortion | $h_e = \frac{d(M-1)\%}{d\phi}$ | $h = \frac{d(M-1)}{d\tan\phi}$ | Base curve diopters | Form of prism (related to eye) |
|---|---|---|---|---|
| 0.00h | 0.00 | 0.00 | −8.40 | Concave. |
| 0.125 | 0.0075 | 0.0125 | −1.34 | Do. |
| 0.250 | 0.0150 | 0.0250 | +6.00 | Convex. |
| 0.375 | 0.0225 | 0.0375 | +13.25 | Do. |
| 0.500 | 0.0300 | 0.0500 | +20.50 | Do. |

TABLE V
Distortion of Single Prism—Power 3Δ

| Units of distortion | $h_e = \frac{d(M-1)\%}{d\phi}$ | $h = \frac{d(M-1)}{d\tan\phi}$ | Base curve diopters | Form of prism (related to eye) |
|---|---|---|---|---|
| 0.00h | 0.00 | 0.00 | −8.60 | Concave. |
| 0.25 | 0.0150 | 0.025 | −3.75 | Do. |
| 0.50 | 0.0300 | 0.050 | +1.25 | Convex. |
| 0.75 | 0.0450 | 0.075 | +6.00 | Do. |
| 1.00 | 0.0600 | 0.100 | +11.00 | Do. |
| 1.25 | 0.075 | 0.125 | +15.67 | Do. |
| 1.50 | 0.090 | 0.150 | +20.50 | Do. |

TABLE VI
Distortion of Single Prism—Power 5Δ

| Units of distortion | $h_e = \frac{d(M-1)\%}{d\phi}$ | $h = \frac{d(M-1)}{d\tan\phi}$ | Base curve diopters | Form of prism (related to eye) |
|---|---|---|---|---|
| 0.00h | 0.00 | 0.00 | −8.80 | Concave. |
| 0.25 | 0.015 | 0.025 | −5.75 | Do. |
| 0.50 | 0.030 | 0.050 | −2.75 | Do. |
| 0.75 | 0.045 | 0.075 | +0.135 | Convex. |
| 1.00 | 0.060 | 0.100 | +3.00 | Do. |
| 1.25 | 0.075 | 0.125 | +6.00 | Do. |
| 1.50 | 0.090 | 0.150 | +8.88 | Do. |
| 1.75 | 0.125 | 0.175 | +11.78 | Do. |
| 2.00 | 0.120 | 0.200 | +14.72 | Do. |
| 2.25 | 0.125 | 0.225 | +17.60 | Do. |
| 2.50 | 0.150 | 0.250 | +20.50 | Do. |

It should be noted that the distortion changes somewhat, although not very considerably, with changes of the visual distance, as shown by a comparison of Figs. 8 and 9, which are made up for reading position, and infinite distance vision, respectively. It may sometimes be advisable to use different corrections for these two distances, but in most cases computation for one distance which may be dominant, concerning desirability of correction, or for an intermediate distance, for example 1.332D, is fully satisfactory.

The foregoing tables are computed for light coming from infinity.

The second above-mentioned specific embodiment, namely the correction of distortional aniseikonia without bending the line of sight, with the aid of so-called "Distortion lenses" will now be described.

Figure 17:
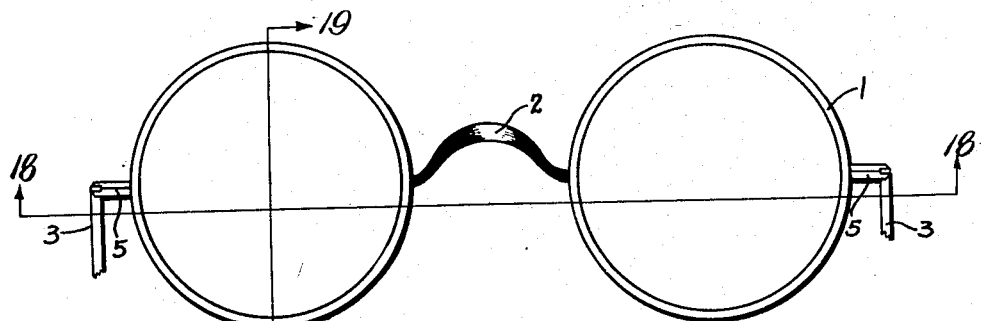
Fig. 17 is a front elevation view, showing a spectacle frame in which is mounted one embodiment of our invention.
Figure 18:
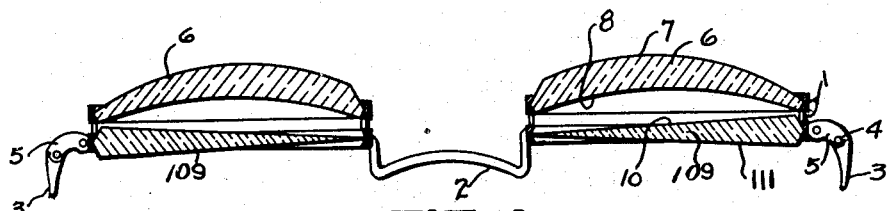
Fig. 18 is a cross-section of Fig. 17 taken along line 18—18 thereof.
Figure 19:
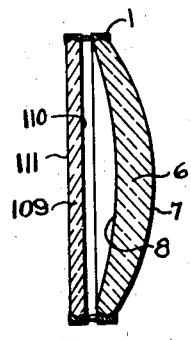
Fig. 19 is a cross-section of Fig. 17, taken along line 19—19 thereof.

As shown in Figs. 17 and 18, a pair of distortionless prism lenses 6 designed as above described and having curved surfaces 7 and 8, are mounted in series, respectively, with a pair of prism lenses 109 having flat or plane surfaces 110 and 111 thereon. These lenses are so mounted that the bases of lenses 6 are opposite the apices of the lenses 109. By this means, as will readily be apparent, the image coming to the eye will first be deflected by the distortionless prism 6. Then, as the image passes through the flat prism 9 it will be deflected in the opposite direction and distorted. Hence, the deflections cancelling one another, only the distortion effected by prism 109 remains. In addition, the image will be magnified.

In the case of this specific embodiment called "Distortion lens", the prism powers of the lenses 6 and 109 are made the same, so that the line of sight enters the eye with no resultant deviation. It is, however, clear that by making the prism powers of the two lenses 6 and 109 different, a resultant deviation of any desired amount may be obtained in accordance with the more general aspect of our invention.

If the prism powers of the two lenses, for example 6 and 109, are made the same, then the light, upon entering the eye, forms a distorted image of a different size from that formed without the lenses, but without deviating the line of sight.

It will readily be seen that the prism 6 which has been curved in both directions to the proper degree to avoid entirely or partially all distortion, and prism 109 bend the line of sight as desired, but at the same time change the size of the image seen therethrough in all meridians. Therefore, if a patient required a different distortional correction for each eye, or if he required a different degree of magnification for each eye, his binocular vision would be impaired because the eyes would see images of different size.

In such instances, we place in series with the lenses as for example shown in Fig. 18, namely the prism pairs 6 and 109 respectively, lenses 113 (Figs. 20 and 21) with curves 114 and 115 so chosen that they will change the size of the image either back to its natural size or to some other size desired without changing the focus.

Figure 20:
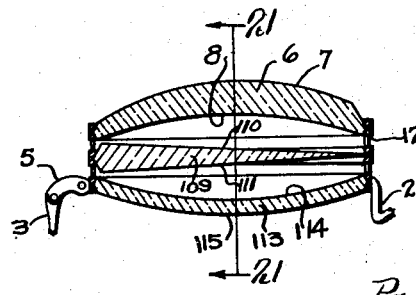
Fig. 20 is a partial sectional view similar to Fig. 18, showing a modification.
Figure 21:
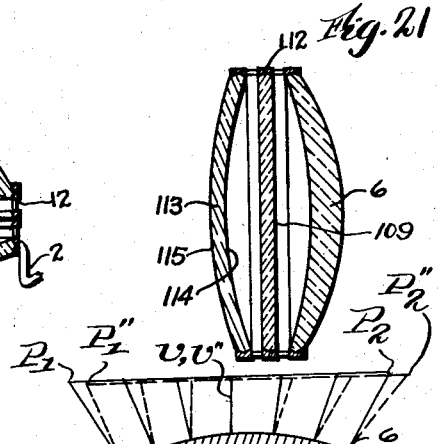
Fig. 21 is a cross-section of Fig. 20, taken along line 21—21 thereof.
Figure 22:
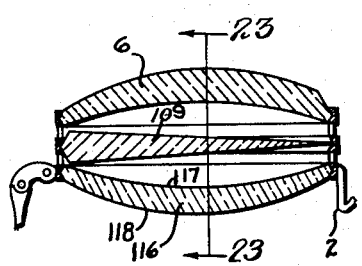
Fig. 22 is a view similar to Fig. 20, showing another modification.
Figure 23:
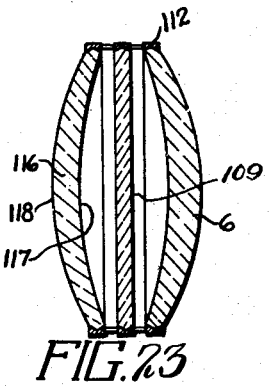
Fig. 23 is a cross-section of Fig. 22, taken along line 23—23 thereof.

Again, if it is desired to change the focus of the image as well as the size, a power lens will be added or, preferably, a lens or lens combination 116 (Fig. 22) having surfaces 117 and 118 is substituted for the lens 113, as shown in Figs. 20 and 21. The curves 117 and 118 of this lens, or the appropriate lens combination, are so designed that they change both size and focus of the image, both by the prescribed amount. The procedure of computation is analogous to that described above.

Examples of prism combinations producing distortion without deviation of the line of sight are given in Tables VII and VIII. For these tables, examples have been chosen where (excepting the units for distortion zero) both prisms are ground on base curves, and arranged as indicated in Figs. 25 and 26. With arrangements of this type, greater amounts of distortion can be obtained than with flat distortion prisms. The pairs of curved prisms of these examples have otherwise the same effect as combinations of flat and curved prisms, namely, one prism produces a distortion and a deviation, and the other a deviation opposing that of the first, without distortion.

As already mentioned, it is further possible, according to our invention, to combine prisms, both curved or one curved and one straight, which produce a prescribed amount of distortion together with a prescribed amount of deviation of the line of sight.

TABLE VII

Distortion Lenses—2 Prisms of Equal Prism Power

| Units of distortion | $h_e = \dfrac{d(M-1)\%}{d\phi}$ | $h = \dfrac{d(M-1)}{d\tan\phi}$ | Base curve 1st power | Base curve 2nd power | Form of prism |
|---|---|---|---|---|---|
| 0.00 | 0.00 | 0.00 | 5Δ on 0 base. | 5Δ on 0 base. | Fig. 25. |
| 0.50 | 0.03 | 0.05 | 5Δ on −3 base. | 5Δ on +3 base. | Fig. 26. |
| 1.00 | 0.06 | 0.10 | 5Δ on −6 base. | 5Δ on +6 base. | Do. |
| 1.50 | 0.09 | 0.15 | 5Δ on −9 base. | 5Δ on +9 base. | Do. |

TABLE VIII

Distortion Lenses—2 Prisms of Equal Prism Power

| Units of distortion | $h_e = \dfrac{d(M-1)\%}{d\phi}$ | $h = \dfrac{d(M-1)}{d\tan\phi}$ | Base curve of 1st prism | Base curve of 2nd prism | Form of prism |
|---|---|---|---|---|---|
| (1 Δ Prism) | | | | | |
| 0.00 | 0.00 | 0.00 | 1 Δ on 0 base | 1 Δ on 0 base | Fig. 25. |
| 0.125 | 0.0075 | 0.0125 | 1 Δ on −1.50 base | 1 Δ on +6 base | Fig. 26. |
| 0.250 | 0.0150 | 0.0250 | 1 Δ on −3.00 base | 1 Δ on +12 base | Do. |
| (3 Δ Prism) | | | | | |
| 0.00 | 0.00 | 0.00 | 3 Δ on 0 base | 3 Δ on 0 base | Fig. 25. |
| 0.25 | 0.015 | 0.025 | 3 Δ on −1.50 base | 3 Δ on +3 base | Fig. 26. |
| 0.50 | 0.030 | 0.050 | 3 Δ on −4.50 base | 3 Δ on +6 base | Do. |
| 0.75 | 0.045 | 0.075 | 3 Δ on −6.00 base | 3 Δ on +9 base | Do. |
| 1.00 | 0.060 | 0.100 | 3 Δ on −7.50 base | 3 Δ on +12 base | Do. |
| (5 Δ Prism) | | | | | |
| 0.00 | 0.00 | 0.00 | 5 Δ on 0 base | 5 Δ on 0 base | Fig. 25. |
| 0.50 | 0.03 | 0.05 | 5 Δ on −3 base | 5 Δ on +3 base | Fig. 26. |
| 1.00 | 0.06 | 0.10 | 5 Δ on −6 base | 5 Δ on +6 base | Do. |
| 1.50 | 0.09 | 0.15 | 5 Δ on −9 base | 5 Δ on +9 base | Do. |

Recapitulating, the various elements of this lens combination may be computed as follows:

First, the proper prism power and base curve for the prism lens 109 is determined, so that it will produce the desired distortion. This can be readily done graphically as indicated, or by trial and error, or by computation, as discussed hereinbefore. It should be noted that it may be desirable to have a greater amount of distortion than can be produced by a flat prism. In that case, a prism on a meniscus base, with the lens turned backward, is used. Combinations of this type are given in Tables VII and VIII.

The next step is the computation of a distortionless prism 6 of the same prism power as the distortion prism 109 in the manner already discussed.

Next we compute the curves for a lens 113 or 116 necessary to change the size of the distorted image back to the desired size. If the focus is not to be changed, a lens like the lens 113 is used, but if the focus is to be changed, a lens like the lens 116, or equivalent structure, is used.

After all these lenses have been finished, they are mounted in a lens holding means, such as the spectacle frame shown, by which they are held in properly fixed relation with respect to each other and are supported in the proper position on the face of the wearer, at the distance from the eyes for which the lenses were computed.

It will also be apparent that we have invented a new means for correcting a distortion error of an eye without deviation of the line of sight and with controlled magnification. In doing this we first place before the eye 119 a flat prism 109 to obtain the proper amount of distortion to correct for the distortion of the eye, after which we place a distortionless magnifying prism lens 6 of the same prism power as the lens 109 before the eye with its base opposite the apex of the lens 109 in order to compensate for the deviation introduced by the flat prism lens 9, and then we place a third lens 113 or 116 before the eye in series with the lenses 109 and 6 to compensate for the change in size introduced by lenses 6 and 109. This means that the line of sight is bent, the image at the same time being magnified; that the line of sight is bent back to its original direction but distortion is introduced; and that the change in size is then compensated for.

This order may be reversed by a corresponding change in the curves of the lenses.

Figure 24:
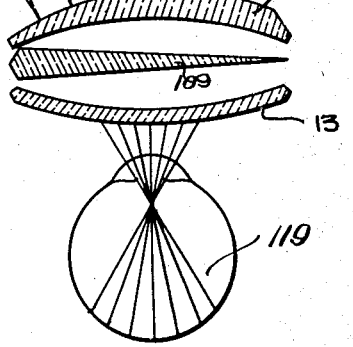
Fig. 24 is a diagrammatic illustration showing one embodiment of our invention in position before an eye.

Fig. 24, analogous to Fig. 15, illustrates such an arrangement, the distances of points $P_1''$ and $P_2''$ from axis $v''$, whose direction is not changed, indicating the distortion with reference to the position of object $P_1$, $P_2$. Size compensating element 113 does not separate object and image planes.

It will be evident that by giving element 113 appropriate curvatures, any desired magnification can be introduced, and that a distance between object and image (in Fig. 24 assumed to be in the same plane) can be introduced by giving element 113 a certain vergence power in addition to its magnification characteristic. It is further evident that the magnification and power components may be effective in any chosen meridian as well as in all meridians, by accordingly shaping the surfaces, if necessary by means of composite lenses incorporating surfaces shaped to accomplish these effects.

It is also understood that by making the opposing prism powers of elements 6 and 109 unequal, a predetermined deviation of the line of sight can be introduced, the resulting effect being in substance the same as that discussed above with reference to Fig. 15. Such a distortion plus deviation lens comprising two prism elements may be preferable in cases where considerable distortion is required.

It will be evident that lens series with distortions and given prism powers that differ in convenient steps (Tables IV, V, VI), including series with distortion zero (Tables I, II, III) or prism power zero (Tables VII and VIII) are useful for testing eyes for eikonic and muscular defects, and within the scope of our invention.

It is to be understood that wherever a "magnifying" prism and a "reducing" lens are called for in the foregoing specification and accompanying claims, both the lens and the prism may be either magnifying or diminishing, it being only necessary that the lens be such as to make the image its proper size after its size has been changed by a prism element.

It is further understood that, at least in certain cases especially favorable for such procedure, the entire size and/or dioptric correction, including that provided by lenses 9, 12, 113 or 116 (Figs. 10, 13, 20, 22) can be incorporated in the element, or elements, having the prism effect.

From the foregoing description it will be seen that we have provided methods and means for carrying out all the objects of the invention, and that we have provided means for correcting distortional aniseikonia and phoria or for correcting distortional errors of the eye without changing the direction of the line of sight of the eye, or for correcting the direction of the line of sight without introducing distortion, and, in all cases, at the same time controlling eikonic conditions other than distortional, and the dioptric properties of the image, whenever it should be necessary.

It should be understood that the present disclosure is for the purpose of illustration only and that this invention includes all modifications and equivalents which fall within the scope of the appended claims.

We claim:

1. An eyeglass for correcting ocular image distortion, and deviation of the line of sight by introducing given compensatory amounts of prismatic distortion and deviation, comprising a lens system having surface means, each of said surface means having in one meridian a curvature, and being spaced relative to the other surface means, forming a prismatic lens system effecting said compensatory distortion, said compensatory deviation and a certain substantially zero power magnification in said meridian, and said surface means being curved in a meridian normal to said first-mentioned meridian so as to produce in said second meridian a magnification substantially equal to said magnification introduced by the curvatures in said first meridian, without substantially affecting said compensatory distortion and said compensatory deviation.

2. An eyeglass for correcting ocular image distortion, and deviation of the line of sight by introducing given compensatory amounts of prismatic distortion and deviation, comprising a lens element having surfaces, each of said surfaces having in one meridian a curvature, and being spaced relative to the other forming a prismatic lens system effecting said compensatory distortion, said compensatory deviation and a certain substantially zero power magnification in said meridian, and each of said surfaces being curved in a meridian normal to said first-mentioned meridian so as to produce a cupped lens element, the said curved surfaces producing in said second meridian a magnification substantially equal to said magnification introduced by the curvatures in said first meridian without substantially affecting said compensatory distortion and said compensatory deviation.

3. An eyeglass for correcting ocular image distortion, and deviation of the line of sight by introducing given compensatory amounts of prismatic distortion and deviation, comprising a lens element having surfaces, each of said surfaces having in one meridian a curvature and being spaced relative to the other forming a prismatic lens system effecting said compensatory distortion, said compensatory prismatic deviation and a certain substantially zero power magnification in said meridian, and a second lens element having surfaces, one convex and the other concave, each of the surfaces of said second element having a curvature in a compensation meridian, being spaced relative to the other and the surfaces of said first lens element and said compensation meridian being located with respect to said first-mentioned meridian to produce in said compensation meridian a magnification substantially equal to said magnification introduced by the curvatures in said first meridian without substantially affecting said compensatory distortion and said compensatory deviation.

4. An eyeglass for correcting ocular image distortion and deviation of the line of sight by introducing given compensatory amounts of prismatic distortion and deviation, comprising a lens element having surfaces, each of said surfaces having in one meridian a curvature and being spaced relative to the other to produce a prismatic lens system effecting said compensatory distortion, said compensatory deviation, a certain substantially zero power magnification in said meridian and a substantially zero power overall magnification, and each of said surfaces being curved in a meridian normal to said first-mentioned meridian so as to produce a cupped lens element, the said curved surfaces producing in said second meridian a magnification counteracting said magnification introduced by the curvatures in said first meridian without substantially affecting said compensatory distortion and said compensatory deviation, and a second lens element having surfaces one convex and the other concave, each of said surfaces having curvatures in two meridians, aligned with said first-mentioned meridians, and being spaced relative to the other and to the surfaces of said first element to produce without substantial change of vergence power a given overall magnification which, together with that of said first element provides an eyeglass with predetermined meridional and overall magnifications.

5. An eyeglass for correcting ocular image distortion and deviation of the line of sight by introducing given compensatory amounts of prismatic distortion and deviation, comprising a lens element having surfaces, each of said surfaces having in one meridian a curvature and being spaced relative to the other to produce a prismatic lens section effecting said compensatory distortion, said compensatory deviation, a certain substantially zero power magnification in said meridian and substantially zero power overall magnification, and each of said surfaces being curved in a meridian normal to said first-mentioned meridian so as to produce a cupped lens element, the said curved surfaces producing in said second meridian a magnification substantially equal to said magnification introduced by the curvatures in said first meridian without substantially affecting said compensatory distortion and said compensatory deviation, and a second lens element having parallel surfaces one convex and the other concave, each of said surfaces having curvatures in two meridians, aligned with said first-mentioned meridians, and being spaced relative to the other and to the surfaces of said first element to produce substantially without change of vergence power, an overall magnification substantially equal to that of said first element, providing an eyeglass substantially without meridional magnification and compensating the overall magnification of said first element.

6. An eyeglass for correcting deviation of the line of sight without ocular image distortion by introducing a given compensatory amount of prismatic deviation, comprising a lens system having surface means, each of said surface means being spaced relative to the other surface means to form a lens system having said compensatory prismatic deviation in one meridian and each of said surface means having in said meridian a curvature producing at said spacing substantially zero prismatic distortion and a certain substantially zero power magnification and each of said surface means being curved in a meridian normal to said prismatic meridian to form a cupped lens system, the said curved surfaces producing in said second meridian a magnification substantially equal to said magnification introduced by the curvatures in said first meridian without substantially affecting said zero distortion and said compensatory deviation.

7. An eyeglass for correcting ocular image distortion without substantially deviating the line of sight by introducing a given compensatory prismatic distortion, comprising a lens system having surface means, each of said surface means having in one meridian a curvature and being spaced relative to the other surface means forming a prismatic lens system effecting a prismatic deviation, said compensatory distortion and a certain substantially zero power magnification, and a second lens system having surface means spaced relative to each other and to the surface means of said first system to produce a prismatic lens system effecting in said meridian a prismatic deviation opposite to and therefore compensating said prismatic deviation of said first system, and also effecting a certain substantially zero power magnification, the surface means of at least one of said elements being curved in a meridian normal to said first meridian so as to produce a cupped lens system, the said curved surface means producing in said second meridian a magnification substantially equal to said magnification introduced by the curvatures in said first meridian without substantially affecting said compensatory distortion and said compensated deviation.

8. Spectacles for correcting binocular vision for distortional aniseikonia of an amount defined by the tested change in magnification ratio with changing peripheral angle, said spectacles comprising a frame, and two lens systems mounted in said frame before the respective eyes, at least one of said systems having surface means, each of said surface means being spaced relatively to the other and having in one meridian a curvature forming a prismatic lens system, the surface means of said two systems, respectively, being in said frame spaced from the respective eyes, and each system being formed of lens medium of a given index of refraction and having surface powers computed according to said indices and according to said spacing, with the surface means of each of said systems being dependent upon the other, said curvatures and said spacing to effect in said meridian a given distortion altering the angles subtended, at a reference point of an eye, by a fan of light rays from object points in a plane through the object and said point to progressively different amounts, substantially in proportion to said distortional aniseikonia.

9. Spectacles for correcting binocular vision for distortional aniseikonia of an amount defined by the tested change in magnification ratio with changing peripheral angle, said spectacles comprising a frame, and two lens systems mounted in said frame before the respective eyes, at least one of said systems having surface means, each of said surface means being spaced relatively to the other and having in one meridian a curvature forming a prismatic lens system and each of said surface means being curved in a meridian normal to said first-mentioned meridian so as to produce a cupped lens system, the surfaces of said two systems, respectively, being in said frame spaced from the respective eyes, and each system being formed of lens medium of a given index of refraction and having surface powers computed according to said indices and according to said spacing, with the surface means of each of said systems being dependent upon the other, said curvatures and said spacing to effect in said first meridian a given distortion altering the angles subtended, at a reference point of an eye, by a fan of light rays from object points in a plane through the object and said point to progressively different amounts, substantially in proportion to said distortional aniseikonia, and also producing a certain substantially zero power magnification, and said curvature in said second meridian producing in that meridian a magnification substantially equal to said magnification introduced by the curvature in said first meridian without substantially affecting said given distortion.

10. Spectacles for correcting binocular vision for distortional aniseikonia of an amount defined by the tested change in magnification with changing peripheral angle and for deviating the direction of at least one of the lines of sight to a predetermined degree, said spectacles comprising a frame, and two lens systems mounted in said frame before the respective eyes, at least one of said systems having surface means, each of said surface means being spaced relative to the other and having in one meridian a curvature forming a prismatic lens system, the surface means of said two systems, respectively, being in said frame spaced from the respective eyes, and each system being formed of lens medium of a given index of refraction and having surface powers computed according to said indices and according to said spacing, with the surface means of each of said systems being dependent upon the other, said curvatures and said spacing to effect in said meridian a given distortion altering the angles subtended, at a reference point of an eye, by a fan of light rays from object points in a plane through the object and said point to progressively different amounts, substantially in proportion to said distortional aniseikonia, and to bend the line of sight of at least one eye to said predetermined degree.

11. Spectacles for correcting binocular vision by deviating the direction of at least one of the lines of sight to a predetermined degree, without introducing ocular image distortion, said spectacles comprising a frame, and two lens systems mounted in said frame before the respective eyes, at least one of said systems having surface means, each of said surface means being spaced relatively to the other and having in one meridian a curvature forming a prismatic lens system, and each of said surface means having in said meridian a curvature producing at said spacing substantially zero distortion, the surface means of said two systems, respectively, being in said frame spaced from the respective eyes, each system being formed of lens medium of a given index of refraction and having surface powers computed according to said indices and according to said spacing, with the surface means of each of said systems being dependent upon the other, said curvatures and said spacing to retain in said meridian unaltered the angles subtended, at a reference point of an eye, by a fan of light rays from object points in a plane through the object and said point, and to bend the line of sight of at least one eye to said predetermined degree.

12. Spectacles for correcting binocular vision for distortional aniseikonia of an amount defined by the tested change in magnification with changing peripheral angle, without substantially deviating the direction of at least one of the lines of sight, said spectacles comprising a frame, and two lens systems mounted in said frame before the respective eyes, at least one of said systems having one lens element with surface means, each of said surface means being spaced relatively to the other and having in one meridian a curvature forming a prismatic lens system effecting a prismatic deviation, and a second lens element having surface means spaced relatively to each other and to the surface means of said first element forming a prismatic lens system effecting in said meridian a prismatic deviation opposite to and therefore compensating said prismatic deviation of said first element, the surface means of said two systems, respectively, being in said frame spaced from the respective eyes, each system being formed of lens medium of a given index of refraction and having surface powers computed according to said indices and according to said spacing, with the surface means of each of said systems being dependent upon the other, said curvatures and said spacing to effect in said meridian a given distortion altering the angles subtended, at a reference point of an eye, by a fan of light rays from object points in a plane through the object and said point to progressively different amounts, substantially in proportion to said distortional aniseikonia, without substantially bending the lines of sight of the eyes.

ADELBERT AMES, Jr.
GORDON H. GLIDDON.
KENNETH N. OGLE.